United States Patent
Cowelchuk et al.

(10) Patent No.: US 7,156,438 B2
(45) Date of Patent: Jan. 2, 2007

(54) SLIDING CONSOLE

(75) Inventors: Glenn A. Cowelchuk, Chesterfield Township, MI (US); Todd L. DePue, Brighton, MI (US); Jerry G. Yatros, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 81 days.

(21) Appl. No.: 10/905,136

(22) Filed: Dec. 17, 2004

(65) Prior Publication Data

US 2006/0131910 A1    Jun. 22, 2006

(51) Int. Cl.
*B60R 7/04* (2006.01)
(52) U.S. Cl. .................................................. 296/24.34
(58) Field of Classification Search ............. 296/24.34, 296/24.3, 37.1, 37.8, 37.14, 37.16; 224/400, 224/275, 281, 545, 547, 548
See application file for complete search history.

(56) References Cited

U.S. PATENT DOCUMENTS

| | | | | |
|---|---|---|---|---|
| 3,356,409 A | * | 12/1967 | Belsky et al. ............ | 296/24.34 |
| 4,705,315 A | * | 11/1987 | Cherry ...................... | 296/37.1 |
| 6,135,529 A | * | 10/2000 | De Angelis et al. ....... | 296/37.8 |
| 6,203,088 B1 | * | 3/2001 | Fernandez et al. ......... | 296/37.8 |
| 6,244,648 B1 | | 6/2001 | Gackstatter | |
| 6,264,261 B1 | * | 7/2001 | Krafcik ..................... | 296/37.8 |
| 6,435,587 B1 | | 8/2002 | Flowerday et al. | |
| 6,497,441 B1 | * | 12/2002 | Mahmood et al. ........ | 296/24.34 |
| 6,572,169 B1 | * | 6/2003 | Panhelleux et al. ....... | 296/24.34 |
| 6,644,709 B1 | * | 11/2003 | Inagaki et al. ........... | 296/37.16 |
| 6,655,561 B1 | * | 12/2003 | Panhelleux et al. ......... | 224/275 |
| 6,726,267 B1 | | 4/2004 | Kim et al. | |
| 6,752,444 B1 | * | 6/2004 | Kitano et al. ............ | 296/184.1 |
| 6,869,121 B1 | * | 3/2005 | Kayumi et al. .......... | 296/37.15 |
| 2002/0089203 A1 | | 7/2002 | Flowerday et al. | |
| 2003/0052500 A1 | | 3/2003 | Atanasiu et al. | |
| 2003/0155786 A1 | | 8/2003 | Kim et al. | |
| 2003/0234550 A1 | * | 12/2003 | Brooks et al. ............. | 296/24.1 |
| 2004/0026947 A1 | * | 2/2004 | Kitano et al. ............. | 296/24.34 |

FOREIGN PATENT DOCUMENTS

EP    1 281 575 A2    2/2003

* cited by examiner

*Primary Examiner*—H Gutman
(74) *Attorney, Agent, or Firm*—Brooks Kushman P.C.

(57) ABSTRACT

A method and system for storage comprising a console and base. The console being slidable within the base so as to permit it to be easily re-positionable. The method and system relating to re-positioning the base, such as to facilitate folding a second row load floor, to facilitate removing the console, and/or to optimize positioning of the console relative to passengers.

20 Claims, 4 Drawing Sheets

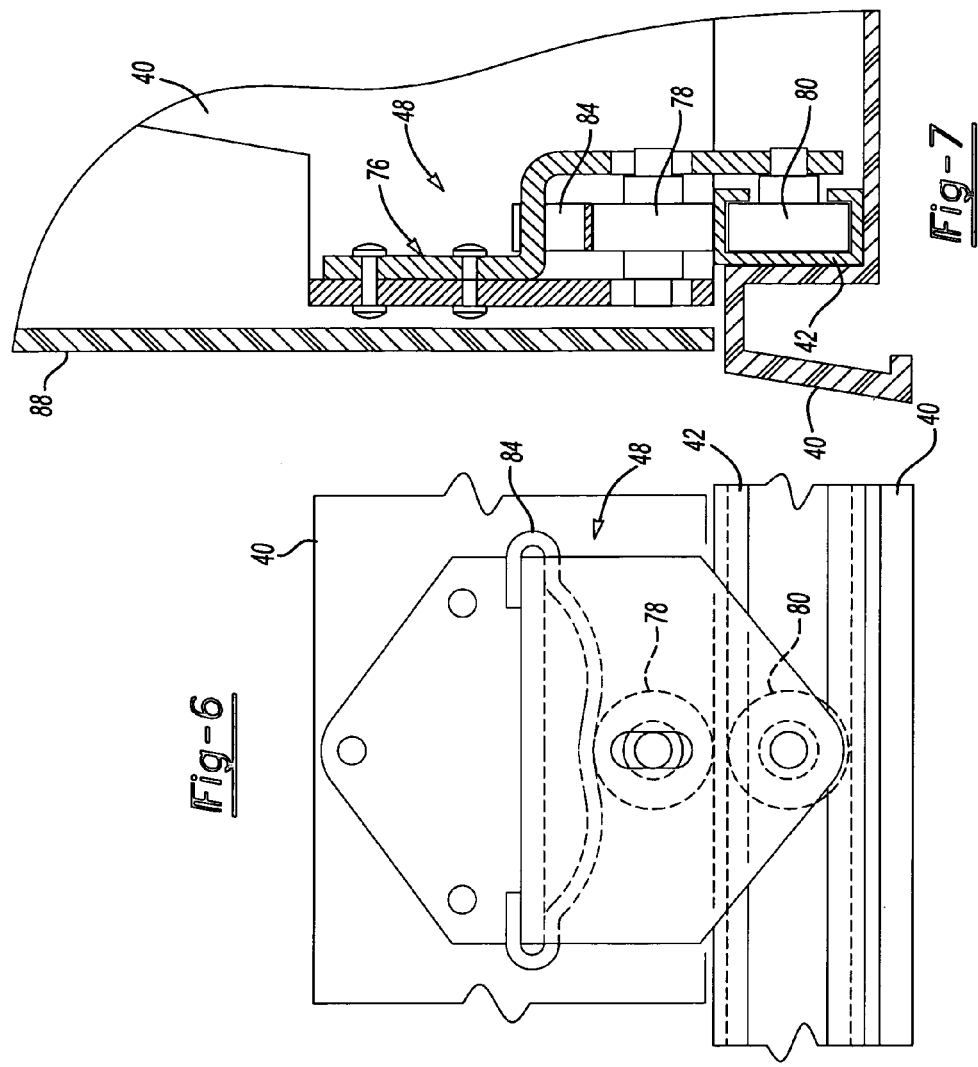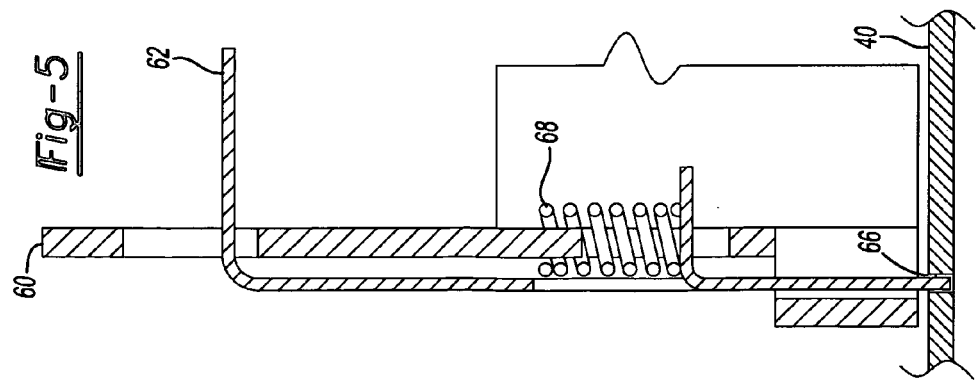

US 7,156,438 B2

SLIDING CONSOLE

BACKGROUND OF THE INVENTION

1. Field of the Invention

The present invention relates to sliding consoles of the type used in vehicles.

2. Background Art

A center console is typically a unit included within a passenger compartment of a vehicle that is configured to store items, and in some cases, to provide passenger seating support. In the past, some center consoles have been permanently affixed to the vehicle. The permanent affixation of the center console in this manner may be disadvantageous if one desires to re-position it within the vehicle and/or if one desires to remove it from the vehicle.

SUMMARY OF THE INVENTION

One non-limiting aspect of the present invention relates to a storage system comprising a console and base. The console is slidable within the base so as to permit it to be easily re-positionable.

In accordance with one non-limiting aspect of the present invention, the storage system may be included within a vehicle having first and second row seats wherein the second row seats are foldable into a cavity below a load floor. In accordance with one non-limiting aspect of the present invention, the console is moveable within the base to permit the load flow to be folded to an obtuse angles so as to permit the second row seats to be folded into the cavities.

In accordance with one non-limiting aspect of the present invention, the base may be configured to permanently affix to a floor in the vehicle and to include channels for receiving at least one roller assembly associated with the console so such that the channels slidably secure the console within the base and yet permit the console to be removable from the base by aligning the roller assemblies proximate the openings and uplifting the console therefrom.

One non-limiting aspect of the present invention relates to a method of folding a second row load floor in a vehicle having first and second rows of seats. The method may include moving at least one seat in the first row of seats from a rearward position toward a forward position, the rearward position characterized as a use position of the seat; moving a center console positioned for use by the first row of seats from a rearward position toward a forward position; and folding the second row load floor to an obtuse angle if the at least one seat in the first row and the center console are positioned toward the respective forward positions.

The above features and advantages, along with other features and advantages of the present invention, are readily apparent from the following detailed description of the invention when taken in connection with the accompanying drawings.

BRIEF DESCRIPTION OF THE DRAWINGS

FIG. 5 illustrates a partial cross-sectional view of a rearward end of the console and base in accordance with one non-limiting aspect of the present invention.

FIGS. 6 and 7 illustrate a cross-sectional view of a roller assembly in accordance with one non-limiting aspect of the present invention.

DETAILED DESCRIPTION OF THE PREFERRED EMBODIMENT(S)

Figure 1:
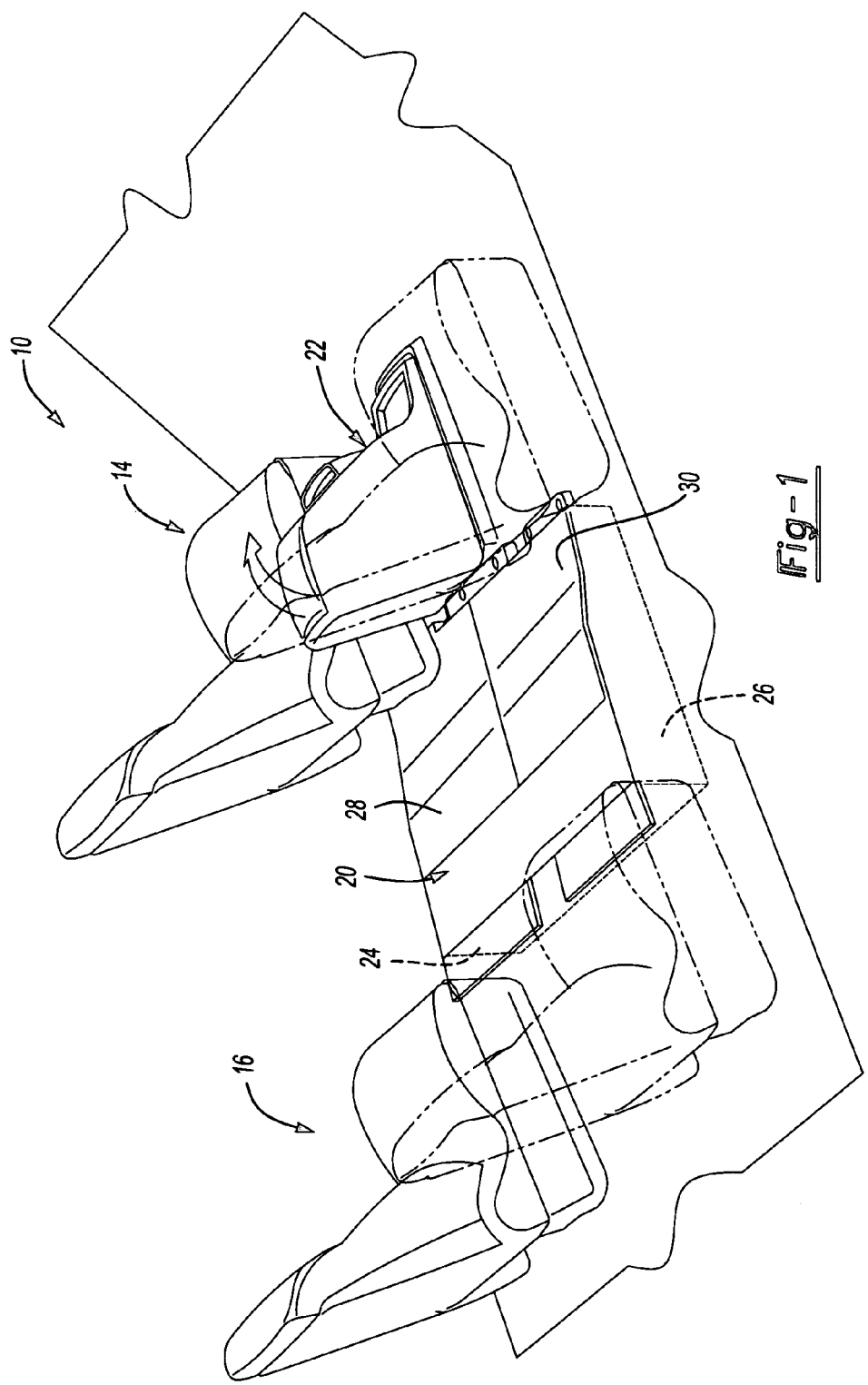
FIG. 1 illustrates a system in accordance with one non-limiting aspect of the present invention.

FIG. 1 illustrates a system 10 in accordance with one non-limiting aspect of the present invention. The system 10 generally relates to a seating and storage arrangement for a vehicle having a first row of seats 14 and a second row of seats 16. The present invention contemplates the use of the system 10 in any vehicular environment, including automobiles.

The first and second row of seats 14, 16 are shown to include bucket seats with the passenger side bucket seats being illustrated in phantom so as to provide a clear view of a second row load floor 20 and center console 22. The present invention, however, contemplates the use of any number and type of seats, including bench seats, and is not intended to be limited to the non-limiting aspect of the present invention shown in FIG. 1.

In accordance with one non-limiting aspect of the present invention, the second row load floor 20 is a foldable item and includes a first half 28 and a second half 30 that are each independently foldable, as described below in more detail, to expose corresponding first and second cavities 24, 26 therebelow. Of course, the present invention contemplates any number of configurations and features for the load floor 20 and is not intended to be limited to any one configuration. For example, the present invention contemplates the load floor 20 including more of less segments that the two haves 28 and 30.

In accordance with one non-limiting aspect of the present invention, the second row seats 16 may be foldable (see FIG. 3) into the first and second cavities if the first and second halves 28, 30 of the load floor 20 are folded upright such that the first and second halves 28, 30 may then be folded back over the folded-down seats, thereby increasing storage capacity in the vehicle. The present invention contemplates any type of seat, including bench seats, being foldable into the cavities, and is not intended to be limited to any one configuration for the second row seats 16.

Figure 2:
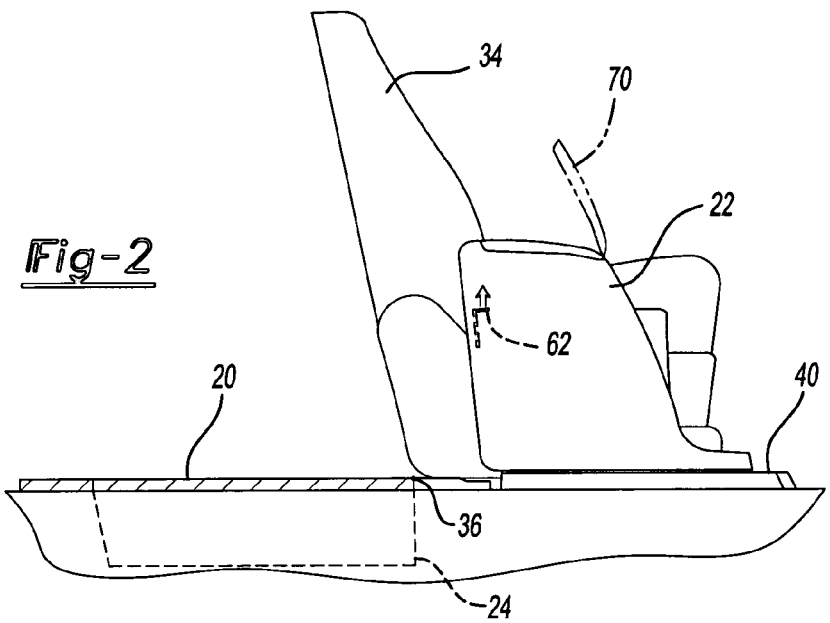
FIG. 2 illustrates a side view of the system with first and second row seats in a rearward position in accordance with one non-limiting aspect of the present invention.

FIG. 2 illustrates the second row load floor 20 and first storage cavity 24 with respect to a driver seat 34 and center console 22 in accordance with one non-limiting aspect of the present invention. As shown, an axis 36 about which the load floor 20 rotates when folded is in close proximity to the driver seat 34 and the center console 22 such that rearward ends of both the driver seat 34 and console 22 extend close to or over a portion of the load floor 20. Because of the close proximity of the axis 36 to the driver seat 34 and center console 22, the driver seat 34 and center console 22 must be slid forwardly to provide clearance therebetween in order to fold the load floor 20 about the axis 36.

Figure 3:
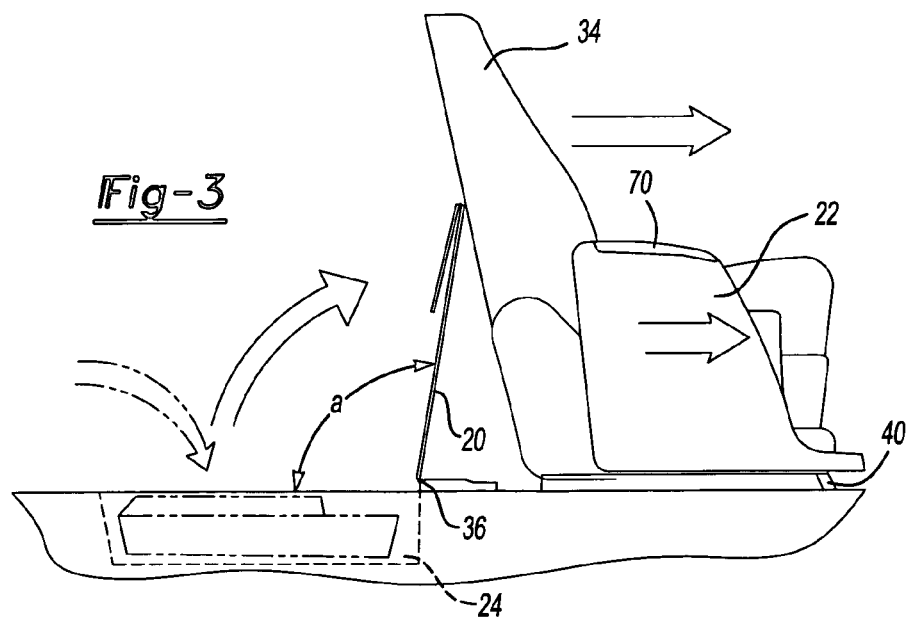
FIG. 3 a side view of the system with first and second row seats in a forward position in accordance with one non-limiting aspect of the present invention.

FIG. 3 illustrates the driver seat 34 and center console 22 being positioned toward a forward end of the vehicle in accordance with one non-limiting aspect of the present invention. In this position, the second row load floor 20 may be folded-up so as to provide room for the second row of seats to fold into the first cavity 24. In more detail, the second row load floor 20 may be foldable to an obtuse angle (a) relative to the first cavity 24 if the driver seat 34 and center console 22 are positioned sufficiently toward the forward end of the vehicle, such as at an angle a of great than 90°.

As shown in FIGS. 2 and 3, the driver seat 34 and the center console 22 may include respective bases upon which their movement takes place. In more detail, the driver seat 34 may include seat rails (not shown) and the center console 22 may include an elongated base 40 which are permanently affixed to the vehicle. Of course, the present invention contemplates that the seat 34 and console 22 may include more or less features to facilitate their re-positioning.

Figure 4:
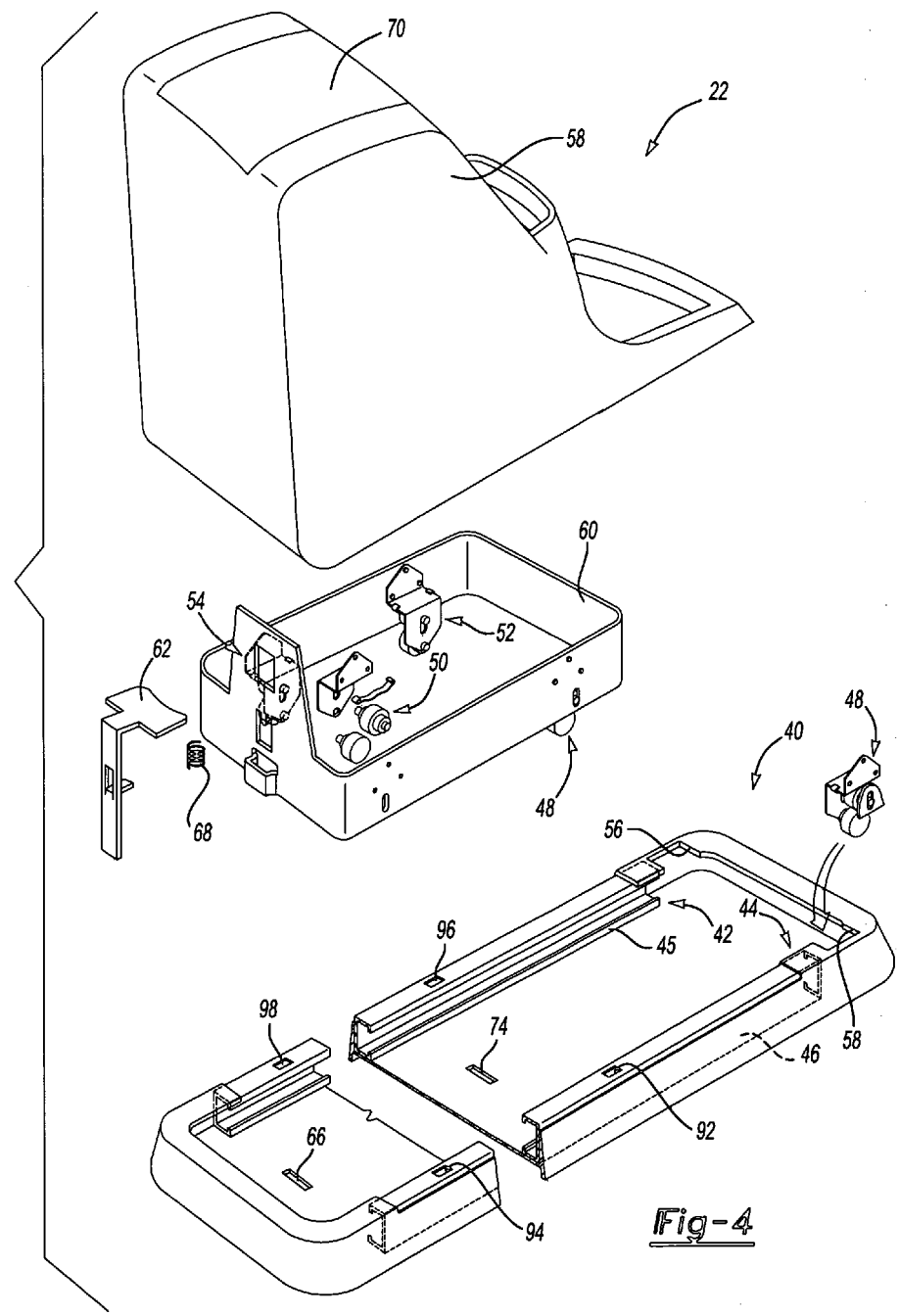
FIG. 4 illustrates a center console assembled in accordance with one non-limiting aspect of the present invention.

FIG. 4 illustrates the center console 22 assembled with the base 40 in accordance with one non-limiting aspect of the present invention. The base 40 may include channels 42, 44, which may include rails 45, 46 or other features, on each elongated side into which roller assemblies 48, 50, 52, 54 may be positioned for slidably moving the console 22 from the rearward position shown in FIG. 2 to the forward position shown in FIG. 3. Of course, the present invention contemplates the channels 42, 44 may include other features or no features for assisting the securement and movement of the roller assemblies 48–54.

In more detail, the base may include openings 56, 58 through which the roller assemblies 48, 50, 52, 54 may be inserted. In this manner, the roller assemblies 48–54 may be inserted through the openings 56, 58 and retained therein so as to slidably secure the console within the base 40. Advantageously, the roller assemblies 48, 50, 52, 54 may be repositioned proximate the openings 56, 58 and uplifted therefrom to remove the console 22 from the base 40.

As shown, openings 56, 58 are included only at forward end of the base 40, however, the present invention contemplates that the base may include more openings at other locations along the channels 40, 42, or rails 45, 46. In particular, the present invention contemplates four openings (in which case the rails 45, 46 may need corresponding openings in their top-side) to permit each roller assembly 48, 50, 52, 54 to be inserted into the rails 45, 46 at the same time and in a downward direction, as opposed the illustrated configuration wherein only two roller assemblies may be inserted at the same time from more of a lateral direction.

In accordance with one non-limiting aspect of the present invention, a storage portion 58 of the console 22 may affix to a frame 60, thereby connecting the storage portion 58 to the roller assemblies 48, 50, 52, 54. For example, the storage portion 58 may be constructed of a plastic material and include storage compartments therein (not shown) and the frame 60 may be constructed of steel or other material and mounted thereto.

In accordance with one non-limiting aspect of the present invention, the console 22 may include a lever 62 to facilitate securing a position of the console 22 within the base. FIG. 5 illustrates a partial cross-sectional view of a rearward end of the console and base 40 in accordance with one non-limiting aspect of the present invention. As shown, the base 40 includes a relief 66 for receiving the lever 62. The lever 62 may include a spring 68 for biasing it into the relief 66 so as to secure positioning of the console 22 proximate the rearward end of the base 40.

The console 22 may be repositioned within the base 40 by uplifting the lever 62 so as to remove the lever 62 from the relief 66, thereby allowing the console to freely move within the channels 40, 42, such as to provide clearance for folding the second row load floor 20. While not shown, the present invention contemplates other means for actuating the lever 62, such as by affixing the lever 62 to an armrest 70 such that the when the armrest is uplifted (see FIG. 2) it automatically releases the lever 62. In accordance with one non-limiting aspect of the present invention, a second relief 74 is provided away from the rearward end of the base to secure the positioning of the console 22 thereto and according to the above-described process, such as to reposition the console 22 to optimize the armrest position of the console relative to the passengers. Moreover, the present invention contemplates the use of snaps or other features for securing position of the console 22 within the base 40, in addition to or in place of the lever 62.

FIGS. 6 and 7 illustrate a cross-sectional view of roller assembly 48 when secured within rail 46 in accordance with one non-limiting aspect of the present invention. The roller assembly 48 may include a two-piece bracket 76 for supporting opposed top and bottom rollers 78, 80. In addition, the roller assembly 48 may include a leaf-spring 84 or other spring for biasing the top roller 78 in a downward direction.

As shown in FIG. 7, the storage portion may be sized, as shown, to include side walls 88 that cover the roller assemblies so as to hide the frame and roller assembly from view. In addition, the optional spring biasing of the top roller 78 against the rail ameliorates gyration and undulation of the console when sliding, which may be advantageous so as to limit spillage of fluid should a cup-holder portion include a cup (not show) having fluid.

In accordance with one non-limiting aspect of the present invention, the rails 45, 46 may include detents 92, 94, 96, 98. The detents 92, 94, 96, 98 may be sufficiently sized to cause the top rollers in each assembly 48–54 to move in a downward direction while yet permitting the rollers to be slide therethrough without undue restrictions. In this manner, the detents 92, 94, 96, 98 may be positioned proximate relative to the reliefs 66, 74, such as relief 66, so as to indicate proper alignment of the console 22, i.e., as user should feel the detents when the console is properly aligned with the relief.

In accordance with one non-limiting aspect of the present invention, the roller assemblies 48, 50, 52, 54 are sufficiently sized to raise the storage portion 58 above a top-side of the base so as to permit the storage portion 58 to slide overtop of either end of the base 40. Of course, however, the present invention contemplates any number of configurations for the console 22, including a console which is unable to slide over-top of the base, and a console moveable with more or less of the above described features, such as with roller assemblies having a single roller or other guide means.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage system for use in a vehicle, the system comprising:
 a base configured to permanently affix to a floor in the vehicle, the base begin elongated in shape and having a channel on each elongated side, the channels being accessible through opening in each elongated side; and
 a console having at least one roller assembly for each elongated side, the roller assemblies being configured to fit through the openings and slide within the channels such that the channels slidably secure the console within the base and wherein the console is removable from the base by aligning the roller assemblies proximate the openings and uplifting the console therefrom.

2. The system of claim 1 wherein the console includes a lever which cooperates with at least one relief in the base to secure a position of the console and thereby prevent the console from sliding within the base.

3. The system of claim 2 wherein the console includes an arm rest on a top side of the console, the arm rest being in communication with the lever such that uplifting of the arm rest releases the lever from the base so as to release the console to slide within the channels.

4. The system of claim 2 wherein the base includes at least a first relief proximate a rearward end of the base to secure the console in a rearward position and a second relief proximate toward a forward end of the base to secure the console in a forward position.

5. The system of claim 1 wherein the console includes elongated sides having a length less than a length of the elongated sides of the base so as to permit the console to slide between a forward and rearward end of the base, the ends corresponding with non-elongated sides of the base.

6. The system of claim 1 wherein the channels each include a rail extending lengthwise therein, and wherein the roller assemblies include a bracket attached the console and opposed top and bottom rollers mounted to the bracket such that the top roller rolls on a top side of the rail and the bottom roller rolls on a bottom side of the rail.

7. The system of claim 6 further comprising at least one spring on at least one of the top rollers to bias the top roller against the top side of the rail.

8. The system of claim 6 wherein the rails include detents to indicate when the console is positioned to a rearward end of the base.

9. A storage system for use in a vehicle having a first row of seats and a second row of seats, the system comprising:
  a base permanently affixed to a floor of the vehicle and proximate the first row of seats, the base begin elongated in shape and having a channel on each elongated side, the channels being accessible through an opening in each elongated side;
  a console having at least one roller assembly for each elongated side, the roller assemblies being configured to fit through the openings and slide within the channels such that the channels slidably secure the console within the base and wherein the console is removable from the base by aligning the roller assemblies proximate the openings and uplifting the console; and
  a foldable load floor between the first and second rows of seats and being foldable about an axis proximate the first row of seats, wherein the load floor is foldable to an obtuse angle if the console is slid away from a rearward end of the base and is prevented from folding to the obtuse angle if the console is slid to the rearward end of the base.

10. The system of claim 9 wherein the console is elongated in proportion to the elongated base and raises therefrom to a height above a seat cushion associated with seat cushions in the first row of seats.

11. The system of claim 9 wherein at least one seat of the first row of seats is slidable between a rearward and forward position and wherein the load floor is foldable to the obtuse angle if the slidable forward first row seat is slid away from the rearward position to the forward position and is prevented from folding to the obtuse angle if the forward first row seat is slid to the rearward position.

12. The system of claim 9 wherein the roller assemblies raise the console above the sides of the bases so as to permit at least a portion of the console to slide over one or both of a forward and rearward end of the base.

13. The system of claim 9 wherein the console includes a lever which cooperates with at least one relief in the base to secure a position of the console and thereby prevent the console from sliding within the base.

14. The system of claim 13 wherein the at least one relief in the base is positioned such that a rearward end of the console overhangs a corresponding rearward end of the base if the lever engages the at least one relief.

15. The system of claim 13 wherein the at least one relief in the base is positioned such that a forward end of the console overhangs a corresponding forward end of the base if the lever engages the at least one relief.

16. The system of claim 9 wherein the channels each include a rail extending lengthwise therein, and wherein the roller assemblies include a bracket attached the console and opposed top and bottom rollers mounted to the bracket such that the top roller rolls on a top side of the rail and the bottom roller rolls on a bottom side of the rail.

17. A method of folding a second row load floor in a vehicle having first and second rows of seats, the method comprising:
  moving at least one seat in the first row of seats from a rearward position toward a forward position, the rearward position characterized as a use position of the seat;
  moving a center console positioned for use by the first row of seats from a rearward position toward a forward position; and
  folding the second row load floor to an obtuse angle if the at least one seat in the first row and the center console are positioned toward the respective forward positions.

18. The method of claim 17 further comprising releasing a lever of the center console to permit the console to be slid toward the forward portion so as to permit the second row load floor to fold to the obtuse angle.

19. The method of claim 17 further comprising providing a base permanently affixed to a floor of the vehicle and proximate the first row of seats, the base being elongated in shape and having a channel on each elongated side, the channels being accessible through openings in each elongated side, and wherein the console includes at least one roller assembly for each elongated side, the roller assemblies being configured to fit through the openings and slide within the channels such that the channels slidably secure the console within the base and wherein the console is removable from the base by aligning the roller assemblies proximate the openings and uplifting the console, and wherein the method further comprises inserting the roller assemblies through the openings in the base to secure the console within the base.

20. The method of claim 19 further comprising removing the secured console by aligning the roller assemblies with the openings and then uplifting the console therefrom.

* * * * *